United States Patent [19]

Eichenauer et al.

[11] Patent Number: 5,302,663
[45] Date of Patent: Apr. 12, 1994

[54] ABS MOLDING COMPOUNDS

[75] Inventors: Herbert Eichenauer, Dormagen; Karl-Heinz Ott, Leverkusen; Alfred Pischtschan, Kürten-Eichhof, all of Fed. Rep. of Germany

[73] Assignee: Bayer AG, Leverkusen, Fed. Rep. of Germany

[21] Appl. No.: 70,494

[22] Filed: Jun. 1, 1993

Related U.S. Application Data

[63] Continuation of Ser. No. 793,161, Nov. 18, 1991, abandoned.

[30] Foreign Application Priority Data

Nov. 29, 1990 [DE] Fed. Rep. of Germany ....... 4038004
Jul. 11, 1991 [DE] Fed. Rep. of Germany ....... 4122870

[51] Int. Cl.⁵ ............... C08L 25/12; C08L 55/02; C08L 69/00
[52] U.S. Cl. ................... 525/67; 525/71; 525/86; 525/238
[58] Field of Search ............ 525/67, 71, 86, 238

[56] References Cited

U.S. PATENT DOCUMENTS

| | | | |
|---|---|---|---|
| 3,903,200 | 9/1975 | Cincera | 525/86 |
| 3,928,494 | 12/1975 | Aliberti | 525/71 |
| 4,068,064 | 1/1978 | Platt | 526/227 |
| 4,520,165 | 5/1985 | Zabrocki et al. | 525/84 |
| 4,560,726 | 12/1985 | Eichenauer et al. | 525/71 |
| 4,868,235 | 9/1989 | Muehlbach | 525/67 |

FOREIGN PATENT DOCUMENTS

| | | |
|---|---|---|
| 0210510 | 2/1987 | European Pat. Off. . |
| 0337187 | 10/1989 | European Pat. Off. . |
| 2901576 | 7/1980 | Fed. Rep. of Germany . |

OTHER PUBLICATIONS

Orbit abstract of DE 2 619 969.
Orbit abstract of DE 1 300 241.
Orbit abstract of DE 3 100 785.
Orbit abstract of EP 359 953.
Orbit abstract of DE 2 842 005.
Orbit abstract of DE 3 506 472.

Primary Examiner—David Buttner
Attorney, Agent, or Firm—Connolly & Hutz

[57] ABSTRACT

Thermoplastic molding compounds comprising three resin components with different molecular weights and two graft rubbers. The thermoplastic molding compounds have high toughness, adequate heat resistance, adjustable surface gloss and excellent thermoplastic processability. The invention also relates to a process for the production of the molding compounds.

7 Claims, No Drawings

ABS MOLDING COMPOUNDS

This application is a continuation of application Ser. No. 07/793,161 filed Nov. 18, 1991, now abandoned.

ABS polymers are distinguished by a balanced toughness, hardness, surface gloss and processability and have therefore been used for many years in large quantities as a thermoplastic resin for the production of moldings of all kinds.

However, as the use of ABS polymers has increased, so too have the requirements which they have to satisfy, particularly when new moldings are to be produced from them or new fields of application involving the use of these new thermoplastic materials are to be opened up.

Thus, materials having a combination of high toughness, high heat resistance, specifically variable surface gloss and excellent thermoplastic processability are required for new applications, for example for the production of parts of large surface area and long flow paths (for example in the automotive field or in the field of casings).

ABS materials which satisfy each of the required properties individually are known. For example, ABS polymers of high toughness are described in EP-A 116 330. In this case, however, it is only possible to obtain high-gloss systems of low heat resistance.

ABS polymers having a matt surface are described, for example, in EP-A 139 271. However, the production of these polymers is relatively complicated.

It is also known that ABS polymers having good flow properties can be produced by addition of large quantities of lubricant, although the other properties are adversely affected by this measure.

It has now been found that molding compounds of the ABS type having the required combination of very good toughness, adequate heat resistance, specifically variable, minimal surface gloss and excellent thermoplastic processability consist of A) 10 to 80 parts by weight and preferably 20 to 70 parts by weight of one or more thermoplastic copolymers or terpolymers synthesized from at least one polymerized vinyl monomer combination selected from styrene, α-methyl styrene, methyl methacrylate, acrylonitrile having an average molecular weight ($\overline{M}_w$) in the range from 120,000 to 200,000 and preferably in the range from 120,000 to 150,000, B) 5 to 60 parts by weight and preferably 7.5 to 50 parts by weight of one or more thermoplastic copolymers synthesized from 60 to 95% by weight and preferably 65 to 85% by weight styrene and 40 to 5% by weight and preferably 35 to 15% by weight acrylonitrile having an average molecular weight ($\overline{M}_w$) in the range from 50,000 to 80,000 and preferably in the range from 60,000 to 80,000, C) 0.1 to 20 parts by weight and preferably 0.5 to 10 parts by weight of one or more thermoplastic copolymers or terpolymers synthesized from at least one polymerized vinyl monomer combination selected from styrene, α-methyl styrene, methyl methacrylate, acrylonitrile having an average molecular weight ($\overline{M}_w$) in the range from 1,500 to 6,000 and preferably in the range from 2,000 to 6,000, D) 0.5 to 40 parts by weight, preferably 1 to 30 parts by weight and, more preferably, 12 to 30 parts by weight of a particulate grafted rubber having a glass temperature of $\leq 10°$ C. and an average particle diameter ($d_{50}$) of 0.05 to 0.5 μm and preferably 0.1 to 0.4 μm which contains per 100 parts by weight rubber from 30 to 80 parts by weight and preferably from 35 to 75 parts by weight of a polymer of styrene, methyl methacrylate, acrylonitrile or mixtures thereof in chemically bound form and E) 0.5 to 30 parts by weight, preferably 1 to 20 parts by weight and, more preferably, 2.5 to 20 parts by weight of a particulate grafted rubber having a glass temperature of $\leq 10°$ C. and an average particle diameter ($d_{50}$) of 1 to 5 μm and preferably 1.2 to 3 μm which contains per 100 parts by weight rubber from 100 to 150 parts by weight and preferably from 110 to 140 parts by weight of a polymer of styrene, α-methyl styrene, methyl methacrylate, acrylonitrile or mixtures thereof in chemically bound form, and optionally, F) 20 to 200 parts by weight, preferably 25 to 150 parts by weight (based on 100 parts by weight of A+B+C+D+E) of one or more aromatic polycarbonates.

The molding compounds according to the invention are prepared by mixing components A, B, C, D, E and optionally F in the melt, optionally in the presence of typical additives, until a homogeneous state is reached.

In one preferred embodiment of the process for producing the molding compounds, components B, C and D are initially mixed and the resulting mixture is subsequently mixed with a mixture of components A, E and optionally F.

Thermoplastic polymers suitable in accordance with the invention for component A are those of at least one monomer combination selected from styrene, α-methyl styrene, methyl methacrylate, acrylonitrile. Particularly preferred polymers A are those of styrene/acrylonitrile mixtures and styrene/α-methyl styrene/acrylonitrile mixtures.

The polymers A are known and may be produced by radical polymerization, more particularly by emulsion, suspension, solution or bulk polymerization (for example in accordance with DE-OS 2 619 969). They may also be obtained in the form of polymers which are not chemically attached to the graft base (generally rubber), for example by graft polymerization in emulsion, suspension, solution or bulk. They must have average molecular weights ($\overline{M}_w$) in the range from 120,000 to 200,000 and preferably in the range from 120,000 to 150,000.

Thermoplastic polymers suitable in accordance with the invention for component B are those of 60 to 95% by weight and preferably 65 to 85% by weight styrene and 40 to 5% by weight and preferably 35 to 15% by weight acrylonitrile.

The polymers B are known and may be produced by radical polymerization, more particularly by emulsion, suspension, solution or bulk polymerization (for example in accordance with DE-OS 2 619 969). They must have average molecular weights ($\overline{M}_w$) in the range from 50,000 to 80,000 and preferably in the range from 60,000 to 80,000.

Thermoplastic polymers suitable in accordance with the invention for component C are those of at least one monomer combination selected from styrene, α-methyl styrene, methyl methacrylate, acrylonitrile. Particularly preferred polymers C are those of styrene/acrylonitrile mixtures, α-methyl styrene/acrylonitrile mixtures, styrene/α-methyl styrene/acrylonitrile mixtures.

The polymers C are known and may be produced by radical polymerization, more particularly by emulsion, suspension, solution or bulk polymerization (for example in accordance with DE-OS 2 619 969 using molecular weight regulators). They must have average molecular weights ($\overline{M}_w$) in the range from 1,500 to 6,000 and preferably in the range from 2,000 to 6,000.

Rubbers having a glass temperature of $\leq 10°$ C. suitable for the production of the first grafted rubber (component D) are, in particular, polybutadiene, butadiene/styrene copolymers, butadiene/acrylonitrile copolymers, polyisoprene or alkyl acrylate rubbers based on $C_{1-8}$ alkyl acrylates, more particularly ethyl, butyl, ethylhexyl acrylate.

The alkyl acrylate rubbers may optionally contain up to 30% by weight (based on the weight of rubber) copolymerized monomers, such as vinyl acetate, acrylonitrile, styrene, methyl methacrylate and/or vinyl ether. In addition, the alkyl acrylate rubbers may contain relatively small quantities, preferably up to 5% by weight (based on the weight of the rubber) of crosslinking ethylenically unsaturated monomers. Crosslinking agents such as these are, for example, alkylenediol diacrylates and methacrylates, polyester diacrylates and methacrylates, divinyl benzene, trivinyl benzene, triallyl cyanurate, allyl acrylate and methacrylate, butadiene or isoprene.

The graft base may also be an acrylate rubber having a core/shell structure with a core of crosslinked diene rubber of one or more conjugated dienes, such as polybutadiene, or a copolymer of a conjugated diene with an ethylenically unsaturated monomer, such as styrene and/or acrylonitrile.

The preferred rubber for the production of the graft rubbers D is polybutadiene.

The rubbers are present in the graft rubber D in the form of at least partly crosslinked particles having an average particle size of 0.05 to 0.5 μm and preferably 0.1 to 0.4 μm.

The graft rubbers D contain per 100 parts by weight rubber from 30 to 80 parts by weight and preferably from 35 to 75 parts by weight of a polymer of styrene, methyl methacrylate, acrylonitrile or mixtures thereof in chemically bound form.

The graft rubbers D may be prepared by radical graft polymerization of the above-mentioned monomers (monomer mixtures) (styrene, methyl methacrylate, acrylonitrile) in the presence of the rubbers to be grafted, preferably by emulsion polymerization; they are all known (cf. for example DE-OS 1 300 241).

Particularly preferred graft rubbers D are the ABS polymers.

Rubbers having a glass temperature of $\leq 10°$ C. suitable for the production of the second grafted rubber E are, in particular, polybutadiene, butadiene/styrene copolymers, butadiene/acrylonitrile copolymers and polyisoprene.

Preferred rubbers for the production of the graft rubbers E are polybutadiene and butadiene/styrene copolymers.

The rubbers are present in the graft rubber E in the form of at least partly crosslinked particles having an average particle diameter ($d_{50}$) in the range from 1 to 5 μm and preferably in the range from 1.2 to 3 μm.

The graft rubbers E contain per 100 parts by weight rubber from 100 to 150 parts by weight and preferably from 110 to 140 parts by weight of a polymer of styrene, α-methyl styrene, methyl methacrylate, acrylonitrile or mixtures thereof in chemically bound form.

The graft rubbers E may be produced by radical graft polymerization of the above-mentioned monomers (monomer mixtures) (styrene, α-methyl styrene, methyl methacrylate, acrylonitrile) in the presence of the rubbers to be grafted, preferably by solution or bulk polymerization; they are all known (cf. for example DE-OS 3 100 785). Particularly preferred graft rubbers E are ABS polymers.

Suitable polycarbonates F can be both homopolycarbonates and copolycarbonates of diphenols of the formulae (I) and (II)

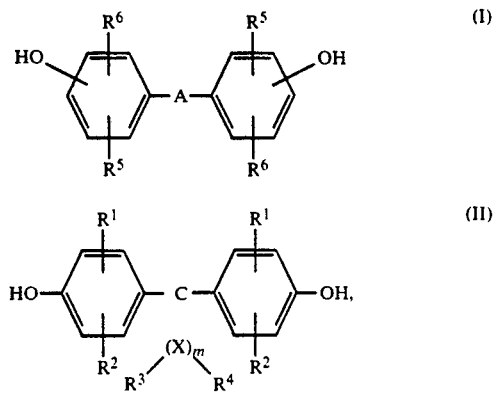

wherein

A is a single bond, $C_1$-$C_5$-alkylene, $C_2$-$C_5$-alkylidene, $C_5$-$C_6$-cycloalkylidene, —O—, —S— or —$SO_2$—, $R^5$ and $R^6$ independently of one another represent hydrogen, methyl or halogen, in particular methyl, chlorine or bromine, $R^1$ and $R^2$ independently of one another represent hydrogen, halogen, preferably chlorine or bromine, $C_1$-$C_8$-alkyl, preferably methyl or ethyl, $C_5$-$C_6$-cycloalkyl, preferably cyclohexyl, $C_6$-$C_{10}$-aryl, preferably phenyl, or $C_7$-$C_{12}$-aralkyl, preferably phenyl-$C_1$-$C_4$-alkyl, in particular benzyl, m is an integer from 4 to 7, preferably 4 or 5, $R^3$ and $R^4$ can be individually selected for each X and independently of one another denote hydrogen or $C_1$-$C_6$-alkyl and X denotes carbon.

The polycarbonates of component F can be either linear or branched and they may contain aromatically bound halogen, preferably bromine and/or chlorine, or they may not contain any aromatically bound halogen and are therefore free of halogen.

The polycarbonates F can be used both separately and as mixtures.

The diphenols of the formulae (I) and (II) are either known from the literature or can be produced by processes known from the literature (see, for example, EP-A 0 359 953).

The production of the polycarbonates of component F which are suitable according to the invention is known from the literature and can, for example, be carried out by the phase interface process using phosgene or by the process in homogeneous phase using phosgene (the so-called pyridine process), the required molecular weight in each case being obtained in known manner by employing an appropriate quantity of known chain terminators.

Suitable chain terminators are, for example, phenol or p.-tert.-butylphenol or long-chain alkylphenols such as 4-(1,3-tetramethyl-butyl)phenol according to DE-OS (German Offenlegungsschrift) 28 42 005 or monoalkylphenols or dialkylphenols containing a total of 8 to 20 C-atoms in the alkyl substituents according to German Offenlegungsschrift No. 35 06 472, such as, for example, p-nonylphenyl, 2,5-di-tert.-butylphenol, p-tert.-octylphenol, p-dodecylphenol, 2-(3,5-dimethylheptyl)-phenol and 4-(3,5-dimethylheptyl)-phenol. The quantity of chain terminators to be employed is in general between 0.5 and 10 mol %, based on the total quantity of diphenols (I) and (II) employed in each case.

The polycarbonates of component F which are suitable according to the invention may be branched in known manner, preferably by the incorporation of 0.05 to 2.0 mol %, based on the total quantity of diphenols employed, of tri- or higher than tri-functional compounds, such as for example those containing three or more than three phenolic OH groups.

They have average weight average molecular weights ($\overline{M}_w$, measured for example by ultracentrifugation or light scattering analysis) of from 10,000 to 200,000, preferably from 20,000 to 80,000.

Suitable diphenols of the formulae (I) and (II) are for example hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxyphenyl)-2,4,4-trimethylcyclopentane.

Preferred diphenols of the formula (I) are 2,2-bis-(4-hydroxyphenyl)propane and 1,1-bis(4-hydroxyphenyl)-cyclohexane and the preferred phenol of the formula (II) is 1,1-bis-(4-hydroxyphenyl)-3,3,5-trimethylcyclohexane.

Mixtures of diphenols may also be used.

The mixtures according to the invention containing components A, B, C, D, E and optionally F and, optionally, typical additives, such as lubricants, stabilizers, pigments, mold release agents, antistatic agents, fillers (for example glass fibers, glass beads, silica gel), are produced by mixing the respective constituents in known manner either simultaneously or successively at room temperature or at a relatively high temperature and then melt-compounding or melt-extruding the resulting mixture at temperatures of 150° C. to 300° C. in standard machines, such as internal mixers, extruders or twin-screw extruders.

A preferred process for producing the molding compounds by mixing special combinations of individual components is described in the foregoing. It is possible by this process to produce molding compounds which lead to moldings having particularly uniform surfaces.

The molding compounds according to the invention may be used for the production of moldings of all kinds using standard methods. They are particularly suitable for the production of moldings where a combination of high toughness, high heat resistance, excellent thermoplastic processability and specifically variable, minimal surface gloss is required, as for example for interior trim parts of automobiles having large surface areas and long flow paths or housings for radios and televisions or computers, for example with numerous ribs.

The molding compounds are preferably processed to moldings by injection molding although they may also be processed by thermoforming of sheets or films produced beforehand by known methods.

The particle diameters mentioned are always average particle diameters $d_{50}$, as determined by ultracentrifuge measurements in accordance with W. Scholtan et al., Kolloid-Z. u.Z. Polymere 250 (1972), 781 to 796 or by counting from electron micrographs.

EXAMPLES

Thermoplastic Resin A1

Statistical styrene/acrylonitrile (72:28) copolymer having an $\overline{M}_w$ of approx. 135,000 obtained by "side-by-side polymerization" of styrene and acrylonitrile (non-grafted styrene/acrylonitrile copolymer) in the production of a graft rubber by radical solution polymerization.

Thermoplastic Resin A2

Statistical styrene/acrylonitrile (72:28) copolymer having an $\overline{M}_w$ of approx. 125,000 obtained by radical emulsion polymerization.

Thermoplastic Resin B

Statistical styrene/acrylonitrile (72:28) copolymer having an $\overline{M}_w$ of approx. 72,000 obtained by radical solution polymerization.

Thermoplastic Resin C

Statistical styrene/acrylonitrile (72:28) copolymer having an $\overline{M}_w$ of approx. 4,000 obtained by radical emulsion polymerization.

Graft Rubber D

Graft rubber obtained by radical emulsion polymerization of a styrene/acrylonitrile (72:28) mixture using a particulate polybutadiene; average particle diameter ($d_{50}$) approx. 0.33 µm. Per 100 parts by weight polybutadiene, 55 parts by weight styrene/acrylonitrile copolymer are chemically attached to the polybutadiene.

Graft Rubber E

Graft rubber obtained by radical solution polymerization of a styrene/acrylonitrile (72:28) mixture using a polybutadiene; average particle diameter ($d_{50}$) approx. 1.2 µm. Per 100 parts by weight polybutadiene, 110 parts by weight styrene/acrylonitrile copolymer are chemically attached to the polybutadiene.

The components were compounded in a 4.5 liter internal mixer at temperatures of 160° C. to 220° C. The moldings were produced in an injection-molding machine at 240° C.

Notched impact strength ($a_k$) was determined at room temperature in accordance with ISO 180/1A (unit: kJ/m$^2$). Processability was determined by measuring the volume flow index MVI in accordance with DIN 53 735 U (unit: cm$^3$/10 mins.) and the necessary filling pressure (cf. F. Johannaber, Kunststoffe 74 (1984), 1, pages 2 to 5). Heat resistance was measured in accordance with DIN 53 460, Vicat/method B (unit: ° C.). Gloss was measured in accordance with DIN 67 530 on a flat plate at a reflection angle of 60° (reflectometer value) using a Byk-Mallinckrodt "Multi-Gloss" multiple-angle reflectometer.

The compositions of the molding compounds tested are shown in Table 1, the test results obtained are shown in Table 2.

Compared with the comparison tests, only the thermoplastic molding compounds according to the invention show good toughness, high heat resistance, excellent processability and variable gloss.

TABLE 1

| | Composition of the molding compounds | | | | | |
|---|---|---|---|---|---|---|
| Example | A1 parts by weight | A2 parts by weight | B parts by weight | C parts by weight | D parts by weight | E parts by weight |
| 1 | 10 | 8 | 48 | 2 | 29.5 | 2.5 |
| 2 | 20 | 7.5 | 38 | 2 | 27.5 | 5 |
| 3 | 39.5 | 6.5 | 18.5 | 1.5 | 23.5 | 10.5 |
| 4 | 20 | 34.5 | 10 | 3 | 27.5 | 5 |
| 5 | 39.5 | 19.5 | 5 | 2 | 23.5 | 10.5 |
| 6 | 59 | 7 | 5 | 1 | 12 | 16 |
| 7 (Comparison) | 79 | — | — | — | — | 21 |
| 8 (Comparison) | — | 76 | — | — | 24 | — |
| 9 (Comparison) | — | 68.5 | — | — | 31.5 | — |
| 10 (Comparison) | — | 8.5 | 60 | — | 31.5 | — |

TABLE 2

| | Test data of the molding compounds | | | | |
|---|---|---|---|---|---|
| Example | $a_K$ (kJ/m$^2$) | Vicat B (°C.) | Filling pressure (bar) | MVI (cm$^3$/10 mins.) | Gloss (°) |
| 1 | 31 | 97 | 141 | 15.1 | 78 |
| 2 | 35 | 98 | 152 | 12.0 | 65 |
| 3 | 41 | 97 | 170 | 8.8 | 58 |
| 4 | 38 | 101 | 175 | 8.8 | 68 |
| 5 | 43 | 101 | 180 | 8.3 | 53 |
| 6 | 38 | 101 | 187 | 7.9 | 50 |
| 7 (Comparison) | 26 | 104 | 200 | 5.0 | 52 |
| 8 (Comparison) | 22 | 103 | 195 | 7.3 | 83 |
| 9 (Comparison) | 30 | 102 | 211 | 4.7 | 78 |
| 10 (Comparison) | 21 | 97 | 165 | 9.5 | 70 |

We claim:

1. Thermoplastic molding compounds having high toughness, adequate heat resistance, adjustable surface gloss and excellent thermoplastic processability, said molding compounds containing A) 20 to 70 parts by weight of one or more thermoplastic copolymers or terpolymers synthesized from at least one polymerized vinyl monomer selected from styrene, α-methyl styrene, methyl methacrylate, acrylonitrile having an average molecular weight ($\overline{M}_w$) in the range from 120,000 to 200,000, B) 5 to 50 parts by weight of one or more thermoplastic copolymers synthesized from 60 to 95% by weight styrene and 40 to 5% by weight acrylonitrile having an average molecular weight ($\overline{M}_w$) in the range from 50,000 to 80,000, C) 1 to 20 parts by weight of one or more thermoplastic copolymers or terpolymers synthesized from at least one polymerized vinyl monomer selected from styrene, α-methyl styrene, methyl methacrylate, acrylonitrile having an average molecular weight ($\overline{M}_w$) in the range from 1,500 to 6,000, D) 12 to 30 parts by weight of a particulate grafted rubber having a glass temperature of ≦10° C. and an average particle diameter ($d_{50}$) of 0.05 to 0.5 μm which contains per 100 parts by weight rubber from 30 to 80 parts by weight of a polymer of styrene, methyl methacrylate, acrylonitrile or mixtures thereof in chemically bound form and E) 2.5 to 20 parts by weight of a particulate grafted rubber having a glass temperature of ≦10° C. and an average particle diameter ($d_{50}$) of 1 to 5 μm which contains per 100 parts by weight rubber from 100 to 150 parts by weight of a polymer of styrene, α-methyl styrene, methyl methacrylate, acrylonitrile or mixtures thereof in chemically bound form, and, optionally, F) 20 to 200 parts by weight (based on 100 parts by weight of A+B+C+D+E) of one or more aromatic polycarbonates wherein the 1 to 20 parts by weight of component C) is in addition to any thermoplastic copolymers or terpolymers having an average molecular weight ($\overline{M}_w$) in the range from 1,500 to 6,000 that may be present in components A) and B).

2. A process for the production of the thermoplastic molding compounds claimed in claim 1, wherein components B, C and D are mixed and the resulting mixture is subsequently mixed with a mixture of components A, E and, optionally, F.

3. Thermoplastic molding compounds having high toughness, adequate heat resistance, adjustable surface gloss and excellent thermoplastic processability, said molding compounds containing A) 20 to 70 parts by weight of one or more thermoplastic copolymers or terpolymers synthesized from at least one polymerized vinyl monomer selected from styrene, α-methyl styrene, methyl methacrylate, acrylonitrile having an average molecular weight ($\overline{M}_w$) in the range from 120,000 to 150,000, B) 7.5 to 50 parts by weight of one or more thermoplastic copolymers synthesized from 65 to 85% by weight styrene and 35 to 15% by weight acrylonitrile having an average molecular weight ($\overline{M}_w$) in the range from 60,000 to 80,000, C) 1.5 to 10 parts by weight of one or more thermoplastic copolymers or terpolymers synthesized from at least one polymerized vinyl monomer selected from styrene, α-methyl styrene, methyl methacrylate, acrylonitrile having an average molecular weight ($\overline{M}_w$) in the range from 2,000 to 6,000, D) 12 to 30 parts by weight of a particulate grafted rubber having a glass temperature of ≦10° C. and an average particle diameter ($d_{50}$) of 0.1 to 0.4 μm which contains per 100 parts by weight rubber from 35 to 75 parts by weight of a polymer of styrene, methyl methacrylate, acrylonitrile or mixtures thereof in chemically bound form and E) 2.5 to 20 parts by weight of a particulate grafted rubber having a glass temperature of $\leq 10°$ C. and an average particle diameter ($d_{50}$) of 1.2 to 3 μm which contains per 100 parts by weight rubber from 110 to 140 parts by weight of a polymer of styrene, α-methyl styrene, methyl methacrylate, acrylonitrile or mixtures thereof in chemically bound form, and, optionally, F) 20 to 150 parts by weight (based on 100 parts by weight of A+B+C+D+E) of one or more aromatic polycarbonates wherein the 1.5 to 10 parts by weight of component C) is in addition to any thermoplastic copolymers or terpolymers having an average molecular weight ($\overline{M}_w$) in the range from 2,000 to 6,000 that may be present in components A) and B).

4. A process for the production of thermoplastic molding compounds comprising forming a mixture of A) 20 to 70 parts by weight of one or more thermoplastic copolymers or terpolymers synthesized from at least one polymerized vinyl monomer selected from styrene, α-methyl styrene, methyl methacrylate, acrylonitrile having an average molecular weight ($\overline{M}_w$) in the range from 120,000 to 200,000, B) 5 to 50 parts by weight of one or more thermoplastic copolymers synthesized from 60 to 95% by weight styrene and 40 to 5% by weight acrylonitrile having an average molecular weight ($\overline{M}_w$) in the range from 50,000 to 80,000, C) 1 to 20 parts by weight of one or more thermoplastic copolymers or terpolymers synthesized from at least one polymerized vinyl monomer selected from styrene, α-methyl styrene, methyl methacrylate, acrylonitrile having an average molecular weight ($\overline{M}_w$) in the range from 1,500 to 6,000, D) 12 to 30 parts by weight of a particulate grafted rubber having a glass temperature of $\leq 10°$ C. and an average particle diameter ($d_{50}$) of 0.05 to 0.5 μm which contains per 100 parts by weight rubber from 30 to 80 parts by weight of a polymer of styrene, methyl methacrylate, acrylonitrile or mixtures thereof in chemically bound form and E) 2.5 to 20 parts by weight of a particulate grafted rubber having a glass temperature of $\leq 10°$ C. and an average particle diameter ($d_{50}$) of 1 to 5 μm which contains per 100 parts by weight rubber from 100 to 150 parts by weight of a polymer of styrene, α-methyl styrene, methyl methacrylate, acrylonitrile or mixtures thereof in chemically bound form, and, optionally, F) 20 to 200 parts by weight (based on 100 parts by weight of A+B+C+D+E) of one or more aromatic polycarbonates.

5. A process according to claim 4, wherein components A), B), C), D), E) and optionally F) are added together simultaneously and then mixed to form said mixture.

6. A process according to claim 4, wherein components A), B), C), D), E) and optionally F) are added together successively while mixing.

7. A process according to claim 4, wherein said process further comprises subjecting said mixture to melt-compounding or melt-extruding at temperatures of from about 150° C. to 300° C.

* * * * *